United States Patent
Yue

(10) Patent No.: US 6,619,798 B2
(45) Date of Patent: Sep. 16, 2003

(54) PISTON TEMPLE FOR EYE GLASS FRAMES

(75) Inventor: Ho Sai Yue, Si Lian Henggang (CN)

(73) Assignee: Lehrer Brillenperfecktion Werks, Inc., Chatsworth, CA (US)

( * ) Notice: Subject to any disclaimer, the term of this patent is extended or adjusted under 35 U.S.C. 154(b) by 0 days.

(21) Appl. No.: 09/966,398

(22) Filed: Sep. 28, 2001

(65) Prior Publication Data

US 2002/0131014 A1 Sep. 19, 2002

(30) Foreign Application Priority Data

Mar. 16, 2001 (CN) .............................. 01215666

(51) Int. Cl.⁷ ................................................ G02C 5/16
(52) U.S. Cl. ....................... 351/113; 351/114; 351/119; 351/153; 16/228
(58) Field of Search .................................. 351/111, 113, 351/114, 118, 119, 121, 153; 16/228

(56) References Cited

U.S. PATENT DOCUMENTS

| | | | | | |
|---|---|---|---|---|---|
| 3,463,568 A | * | 8/1969 | Hasday | ........................ | 351/113 |
| 3,837,735 A | * | 9/1974 | Guillet | ........................ | 351/113 |
| 4,534,628 A | * | 8/1985 | Morel | ........................ | 351/153 |
| 4,787,727 A | * | 11/1988 | Boodman et al. | ........... | 351/118 |
| 5,751,393 A | * | 5/1998 | Yamazaki | ................... | 351/63 |
| 5,953,791 A | * | 9/1999 | Da Forno | .................... | 351/153 |
| 6,027,215 A | * | 2/2000 | Hsu | ........................... | 351/114 |
| 6,152,562 A | * | 11/2000 | Montalban | ................... | 351/153 |

\* cited by examiner

Primary Examiner—Huy Mai
(74) Attorney, Agent, or Firm—Christie, Parker & Hale, LLP

(57) ABSTRACT

An eye glass frame temple is provided having a pole head portion, a leg portion rotatably coupled to the pole head portion, and a spring loaded pin for exerting a force against the leg portion when the leg is rotated a predetermined amount and in a predetermined first direction relative to the pole head portion. The force can cause the leg portion to rotate in a second direction opposite the first direction.

30 Claims, 2 Drawing Sheets

PISTON TEMPLE FOR EYE GLASS FRAMES

CROSS-REFERENCE TO RELATED APPLICATION

This application is based upon and claims priority on Chinese application No. 01215666.3 filed on Mar. 16, 2001, a copy of which is attached hereto as Appendix A and is fully incorporated herein by reference.

BACKGROUND OF THE INVENTION

The present invention is directed to a piston temple for eye glass frames and more specifically to a temple incorporating a piston. Eye glass frames consist of two temple portions 100 as shown in FIG. 3. Typically each temple portion consists of a folding leg portion 6 and pole head portion 2 which are coupled together by a hinge 3 shown in FIG. 3. The pole head portion extends from a rim 102 surrounding a lens of the eye glass frame or from the lens. A spring mechanism is incorporated and coupled to the hinge for allowing the leg portion of the temple to flex outward. By being able to flex outward, the leg portions exert a lower pressure against the sides of the head of the person wearing the glasses. Also, the act of wearing the glasses is made easier since the leg portions can be flexed outward making it easier for them to be positioned on the sides of the wearer's head.

Existing spring temples as shown in FIGS. 3 and 4 have a pole head portion 2, a hinge 3, a draw bar 8, a sliding sleeve 9, a spring 5, and a block 10 which are installed in an inner cavity 104 of a jacket 1, which extends leg portion 6. The draw bar comprises a larger diameter portion 8a from which extends a smaller diameter portion 8b. A sliding sleeve having a cylindrical opening having a diameter larger than the diameter of the smaller diameter portion of the draw bar and smaller than the diameter of the larger diameter portion of the draw bar is slid over the draw bar smaller diameter portion 8b such that the draw bar smaller diameter portion penetrates the opening. The outer surface of the sleeve 9 defines a concavity 15.

The spring 5 is fitted over the draw bar smaller diameter portion 8b such that the sleeve is sandwiched between the larger diameter portion 8a of the draw bar and the spring 5. The block 10 is fitted or otherwise attached to the lower diameter portion 8b of the draw bar such that the spring is sandwiched between the sleeve and the block. The entire assembly of draw bar, sleeve, spring and block is fitted within the cavity.

A protrusion 14 extends from a side wall of the cavity. The protrusion may be a convex protrusion as shown in FIG. 4. The protrusion is positioned within the concavity 15 defined on the outer surface of the sleeve for restraining the sleeve in an axial direction.

A hinge 3 is pivotally attached to the front end of the larger diameter section 8a of the draw bar. The hinge is attached to the larger diameter section of the draw bar by a screw 31. The pole head portion 2 is attached to the hinge typically by welding. In this regard, as the leg portion 6 or jacket 1 is rotated relative to the pole head portion 2 away from the rim 102, the hinge 3 will rotate and cause the draw bar to withdraw from the cavity of the jacket. As that occurs, the convex protrusion 14 prevents the sleeve 9 from moving axially. In this regard, the draw bar small diameter portion slides relative to the sleeve compressing the spring 5. When the leg portion or jacket 1 is released, the force generated by the compressed string 5 will cause the lower diameter portion of the draw bar to extend rearwardly and thus draw the draw bar rearwardly causing the jacket portion to align with the pole head portion.

As can be seen this is a rather complex temple that is very difficult to manufacture. Furthermore, because of the multiple moving parts, the weight of the spring temple is relatively great.

SUMMARY OF THE INVENTION

An eye glass frame temple is provided having a pole head portion, leg portion rotatably coupled to the pole head portion and a pin spring loaded by a spring for exerting a force when the leg is rotated a predetermined amount and in a predetermined first direction relative to the pole head portion. The generated force can cause the leg portion to rotate in a second direction opposite the first direction.

In an exemplary embodiment, the pin is coupled to the leg portion of the temple and extends due to a spring force in a direction toward the pole head portion. When the leg portion is rotated relative pole head portion in a direction away from the eye glass frame, the pole head portion is engaged by the pin causing the pin to compress the spring generating a spring force. Once the leg is released, the spring force causes the pin to push against the pole head portion and cause the leg portion to rotate in an opposite direction, i.e., toward the frame. In an alternate exemplary embodiment, the pin is coupled to the pole head portion and extends due to a spring force in a direction toward the leg portion.

DETAILED DESCRIPTION

Figure 1:
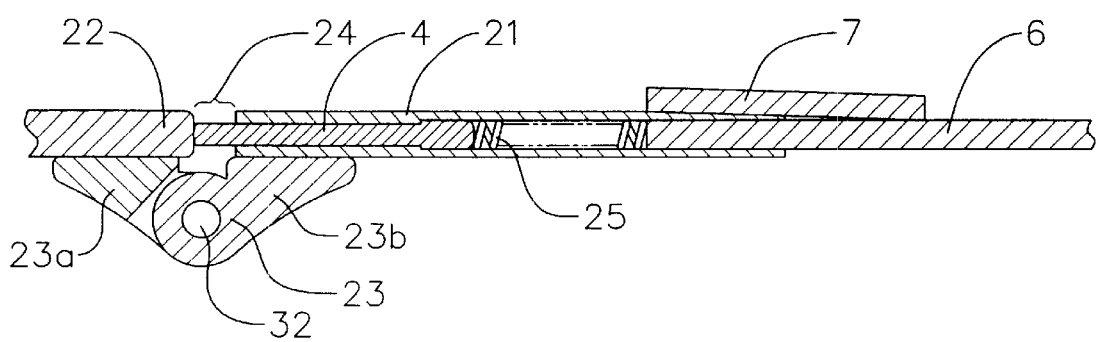
FIG. 1 is a partial cross-sectional view of a exemplary temple of the present invention.

In the present invention a temple incorporating a spring is provided. It should be noted that the terms "front" "rear" and "rearwardly" are used herein for descriptive purposes to denote the relative position of elements and not necessarily the exact position of such elements. The inventive temple includes a pole head portion 22, a jacket 21, hinge 23, a pin 4, a spring 25, and a leg portion 6. The hinge 23 is a two member hinge having legs 23a and 23b which are hingably coupled to each other about a hinge axis 32. This may be accomplished by an axial screw threaded along hinge axis 32.

Hinge leg 23a is coupled to the pole head portion 22 while hinge leg 23b is coupled to the jacket 21. In the exemplary embodiment, the legs of the hinge are welded to the pole head portion 22 and to the jacket 21, respectively such that the pole head portion is spaced apart from the jacket 21 by a space 24, when the jacket 21 is linearly aligned with the pole head portion 22, as for example shown in FIG. 1. In this regard, the pole head portion can rotate toward the jacket 21.

Figure 2:
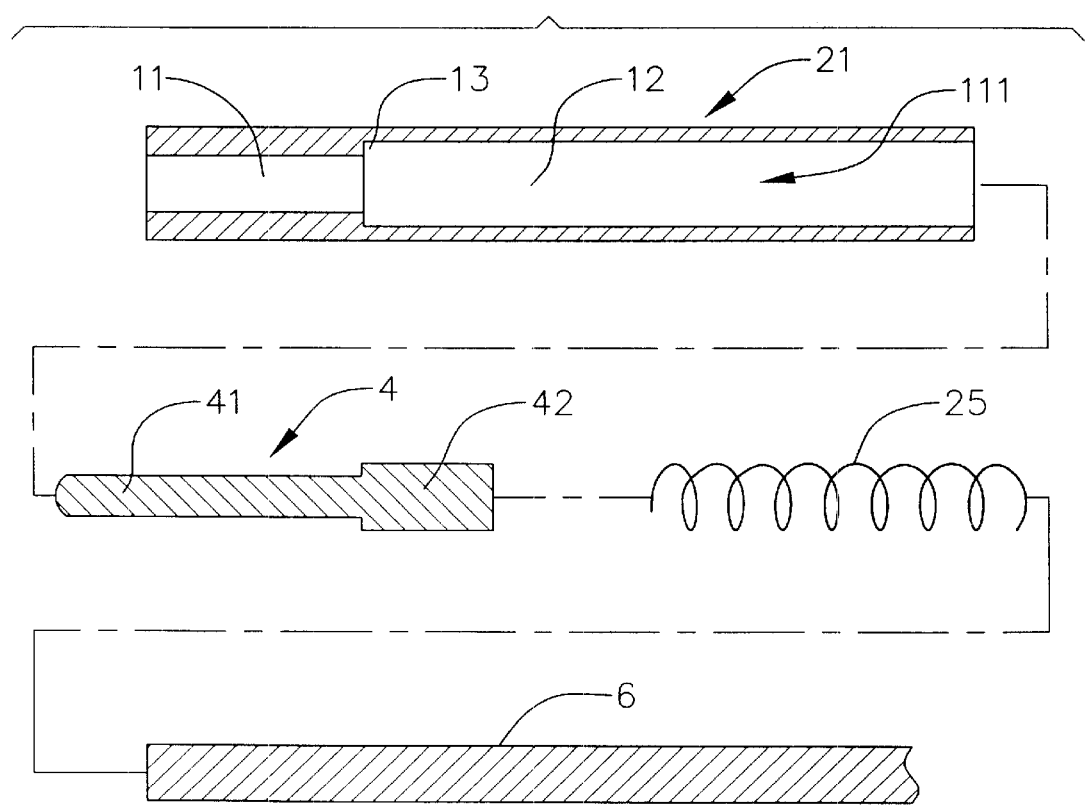
FIG. 2 is an exploded assembly view of the jacket, piston, spring and leg portion forming the temple shown in FIG. 1.
Figure 3:
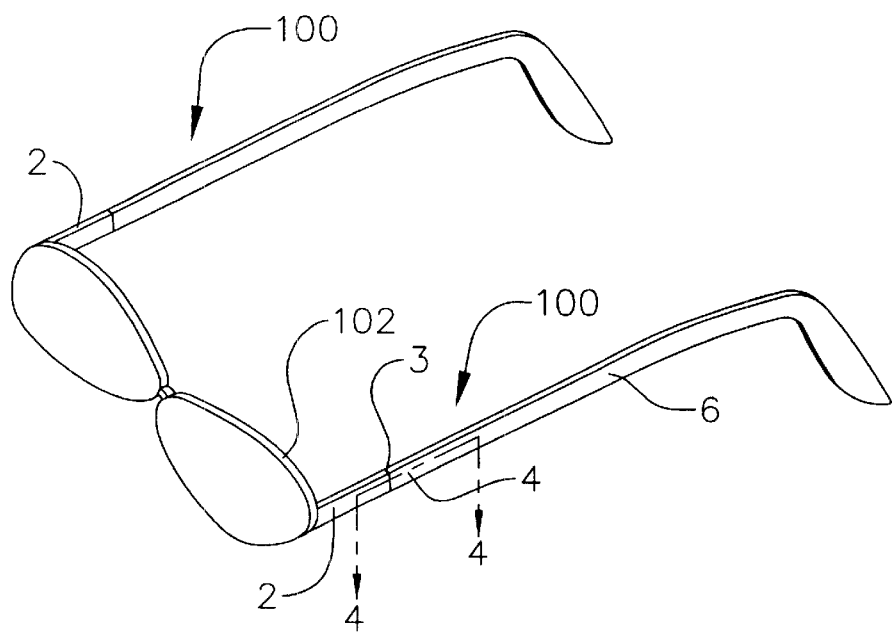
FIG. 3 is a perspective view of a prior art eye glass frame.
Figure 4:
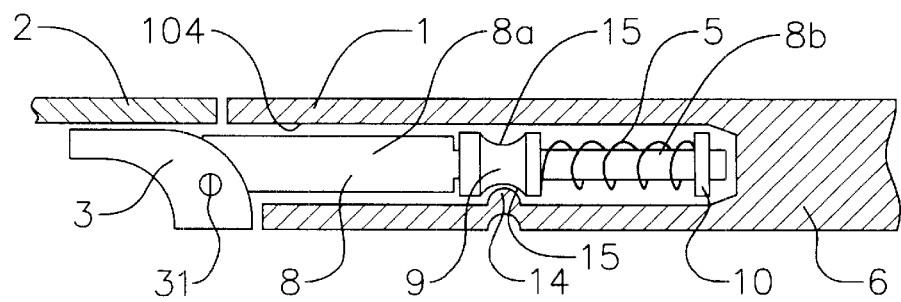
FIG. 4 is a cross-sectional view taken along arrows 4—4 on the temple of the eye glass frame shown in FIG. 3.

The jacket has a cylindrical opening 111 comprising two sections (FIG. 2). Specifically, the jacket has a smaller diameter cylindrical section 11 which is stepped to a larger diameter cylindrical section 12 forming an annular shoulder 13 there between.

A pin 4 is fitted into the cylindrical opening and also comprises two cylindrical sections 41 and 42. A first pin cylindrical section 41 extends from a second pin cylindrical section 42. The first pin cylindrical section 41 has a diameter smaller than the jacket opening first cylindrical section 11. The diameter of the pin second section 42 has a diameter smaller than the jacket opening second section diameter 12 but greater than the jacket opening diameter first section 11. In this regard, the pin can slide from the larger diameter section end of the jacket such that the pin first section can penetrate the jacket opening first section until the pin second larger diameter section abuts the annular shoulder 13 formed on the jacket opening. In essence, the pin acts as a piston.

The spring 25 fitted behind the second larger diameter section of the pin 12. The leg 6 is then fitted within the jacket opening second larger diameter section such that the spring is sandwiched between the leg 6 and the pin second larger diameter section. The leg may be welded to the jacket or may be coupled to the jacket using an external bracket 7 which is attached, preferably welded, to both the jacket and the leg. In the exemplary embodiment shown in FIG. 1, when moved against the spring, the pin compresses the spring.

The length of the pin first smaller diameter section 41 is such that when the pin second larger diameter section 42 abuts the jacket annular shoulder 13, a portion of the pin first section 41 extends beyond the front end of the jacket opening 111. In the exemplary embodiment, shown in FIG. 1, the pin first section 41 extends far enough in front of the jacket 21 for occupying at least a majority of the space 24 between the jacket and the pole head portion when the jacket is linearly aligned with the pole head portion. In this regard, the pin contacts the pole head portion for maintaining the jacket relatively linearly aligned with the pole head portion.

As the leg portion is rotated or pivoted about pivot axis 32 relative to the pole head portion in a direction away from the eye glass rim, the pin is engaged by the pole head portion which causes the pin to move rearwardly in relation to the jacket compressing the spring again the leg 6 providing a spring action. When the leg or jacket is released, the spring force generated by the compressed spring exerts a force against the pin which in turn pushes against the rear end of the pole head portion causing the leg to rotate relative to the temple in an opposite direction so as to return the leg portion to its original relatively aligned position. As can be seen the inventive temple provides for a spring action using a simple structure.

Although the present invention has been described and illustrated in respect to an exemplary embodiment, it is to be understood that it is not to be so limited, since changes and modifications may be made therein which are within the full intended scope of this invention as hereinafter claimed. For example, other mechanisms may be used to limit the travel of the pin 4 relative to the jacket. Alternatively, the jacket with pin may be formed on, or extend from, the pole head portion instead from the leg portion such that the tip of the pin extending beyond the jacket will make contact with the leg portion when the leg portion is rotated relative to the pole head portion in a direction away from the frame. Furthermore, the leg portion 6 may be attached to the outer surface of the jacket and a separate stopper (not shown) may be inserted into the rear end of the jacket so as to sandwich the spring 25 between the pin and the stopper.

What is claimed is:

1. An eye glass frame temple comprising:
   a pole head portion;
   a jacket comprising an opening:
   a leg portion extending from the jacket, wherein the leg portion is coupled to the pole head portion and pivots relative to the pole head portion;
   a pin slidably coupled to the jacket and having a portion extendable beyond the jacket engaging the pole head portion when the leg portion is pivoted relative to the pole head portion a predetermined amount in a first direction and disengaging from the pole head portion when the leg portion is pivoted relative to the pole head portion a predetermined amount in a second direction opposite the first direction, wherein the leg portion is coupled to the jacket by welding.

2. A temple as recited in claim 1 wherein the pin is slidably fitted within the jacket opening, the temple further comprising a spring within the jacket opening urging the pin to extend beyond the jacket.

3. A temple as recited in claim 2 wherein the leg portion is welded to an end of the jacket opening sandwiching the spring between the leg portion and the pin.

4. A temple as recited in claim 1 wherein the leg portion is fitted within the jacket opening and wherein a bracket is welded to the jacket and to the leg portion.

5. An eye glass frame temple comprising:
   a pole head portion;
   a jacket comprising an opening, wherein the jacket opening comprises,
      a first section, and
      a second section extending coaxially from the first section and having a diameter greater than the diameter of the first section, wherein an annular shoulder is defined between the first and second sections;
   a leg portion extending from the jacket, wherein the leg portion is coupled to the pole head portion and pivots relative to the pole head portion;
   a pin slidably coupled to the jacket and having a portion extendable beyond the jacket engaging the pole head portion when the leg portion is pivoted relative to the pole head portion a predetermined amount in a first direction and disengaging from the pole head portion when the leg portion is pivoted relative to the pole head portion a predetermined amount in a second direction opposite the first direction.

6. A temple as recited in claim 5 wherein the pin comprises:
   a first section having a diameter smaller than the diameter of the jacket opening first section; and
   a second section extending coaxially from the pin first section and having a diameter smaller than the diameter of the jacket opening second section and greater than the diameter of the jacket opening first section, and wherein the pin first section is slidably fitted within the jacket opening first section and wherein the pin second section is slidably fitted within the jacket opening second section.

7. A temple as recited in claim 6 further comprising a spring fitted within the jacket opening second section for urging the pin to extend beyond the jacket.

8. A temple as recited in claim 7 wherein the spring is sandwiched between the pin second section and the leg portion.

9. A temple as recited in claim 6 wherein the leg portion is welded to an end of the jacket opening sandwiching the spring between the leg portion and the pin.

10. A temple as recited in claim 6 wherein the leg portion is fitted within the jacket opening and wherein a bracket is welded to the jacket and to the leg portion.

11. A temple as recited in claim 6 wherein the pin second section is engageable with the annular shoulder, wherein the pin first section comprises an axial length extending from the pin second section to an end of the pin first section opposite the second section, and wherein when the pin second section engages the annular shoulder a majority of said pin first section axial length is within the opening first section.

12. An eye glass frame temple comprising:
a first portion;
a second portion;
a jacket comprising an opening, said jacket coupled to one of said first and second portions by welding and extending from one of said first and second portions;
a hinge pivotally coupling the jacket to the other of said first and second portions;
a pin slidably coupled to the jacket and having a portion extendable beyond the jacket engaging said other of said first and second portions when the second portion is pivoted relative to the first portion a predetermined amount in a first direction and disengaging from said other of said first and second portions when the second portion is pivoted relative to the first portion a predetermined amount in a second direction opposite the first direction.

13. A temple as recited in claim 12 wherein the pin is slidably fitted within the jacket opening, the temple further comprising a spring within the jacket opening urging the pin to extend beyond the jacket.

14. A temple as recited in claim 13 wherein said one of said first and second portions is welded to an end of the jacket opening sandwiching the spring between said one of said first and second portions and the pin.

15. A temple as recited in claim 12 wherein the jacket opening comprises:
a first section; and
a second section extending coaxially from the first section and having a diameter greater than the diameter of the first section, wherein an annular shoulder is defined between the first and second sections.

16. A temple as recited in claim 15 wherein the pin comprises:
a first section having a diameter smaller than the diameter of the jacket opening first section; and
a second section extending coaxially from the pin first section and having a diameter smaller than the diameter of the jacket opening second section and greater than the diameter of the jacket opening first section, and wherein the pin first section is slidably fitted within the jacket opening first section and wherein the pin second section is slidably fitted within the jacket opening second section.

17. A temple as recited in claim 16 further comprising a spring fitted within the second opening section for urging the pin to extend beyond the jacket.

18. A temple as recited in claim 16 wherein the pin second section is engageable with the annular shoulder, wherein the pin first section comprises an axial length extending from the pin second section to an end of the pin first section opposite the second section, and wherein when the pin second section engages the annular shoulder a majority of said pin first section axial length is within the opening first section.

19. A temple as recited in claim 12 wherein said one of said first and second portions is fitted within the jacket opening and wherein a bracket is welded to the jacket and to said one of said first and second portions.

20. An eye glass frame temple comprising:
a pole head portion;
a jacket comprising an opening comprising,
a first section, and
a second section extending coaxially from the first section and having a diameter greater than the diameter of the first section, wherein an annular shoulder is defined between the first and second sections;
a leg portion extending from the jacket, wherein the leg portion is coupled to the pole head portion and pivots relative to the pole head portion; and
a pin slidably coupled to the jacket and having a portion extendable beyond the for engaging the pole head portion, wherein the pin comprises,
a first section having a diameter smaller than the diameter of the jacket opening first section, and
a second section extending coaxially from the pin first section and having a diameter smaller than the diameter of the jacket opening second section and greater than the diameter of the jacket opening first section, and wherein the pin first section is slidably fitted within the jacket opening first section and wherein the pin second section is slidably fitted within the jacket opening second section.

21. A temple as recited in claim 20 further comprising a spring fitted within the second opening section for urging the pin to extend beyond the jacket.

22. A temple as recited in claim 21 wherein the spring is sandwiched between the pin second section and the leg portion.

23. A temple as recited in claim 21 wherein the leg portion is welded to an end of the jacket opening sandwiching the spring between the leg portion and the pin.

24. A temple as recited in claim 20 wherein the pin second section is engageable with the annular shoulder, wherein the pin first section comprises an axial length extending from the pin second section to an end of the pin first section opposite the second section, and wherein when the pin second section engages the annular shoulder a majority of said pin first section axial length is within the opening first section.

25. A temple as recited in claim 20 wherein the leg portion is fitted within the jacket opening and wherein a bracket is welded to the jacket and to the leg portion.

26. An eye glass frame temple comprising:
a first portion;
a second portion;
a jacket comprising an opening, said jacket extending from one of said first and second portions, said jacket opening comprising,
a first section, and
a second section extending coaxially from the first section and having a diameter greater than the diameter of the first section, wherein an annular shoulder is defined between the first and second sections;
a hinge pivotally coupling the jacket to the other of said first and second portions; and
a pin slidably coupled to the jacket and having a portion extendable beyond the jacket for engaging said other of said first and second portions, wherein the pin comprises,
a first section having a diameter smaller than the diameter of the jacket opening first section, and
a second section extending coaxially from the pin first section and having a diameter smaller than the diameter of the jacket opening second section and greater than the diameter of the jacket opening first section, and wherein the pin first section is slidably fitted within the jacket opening first section and wherein the pin second section is slidably fitted within the jacket opening second section.

27. A temple as recited in claim 26 further comprising a spring fitted within the second opening section for urging the pin to extend beyond the jacket.

28. A temple as recited in claim 27 wherein said one of said first and second portions is welded to an end of the jacket opening sandwiching the spring between said one of said first and second portions and the pin.

29. A temple as recited in claim 26 wherein the pin second section is engageable with the annular shoulder, wherein the pin first section comprises an axial length extending from the pin second section to an end of the pin first section opposite the second section, and wherein when the pin second section engages the annular shoulder a majority of said pin first section axial length is within the opening first section.

30. A temple as recited in claim 26 wherein said one of said first and second portions is fitted within the jacket opening and wherein a bracket is welded to the jacket and to said one of said first and second portions.

* * * * *

UNITED STATES PATENT AND TRADEMARK OFFICE
CERTIFICATE OF CORRECTION

PATENT NO. : 6,619,798 B2
DATED : September 16, 2003
INVENTOR(S) : Ho Sai Yue

It is certified that error appears in the above-identified patent and that said Letters Patent is hereby corrected as shown below:

Title page,
Item [30], Foreign Application Priority Data, replace "01215666" with
-- 01215666.3 --

Column 6,
Line 24, replace "second opening section" with -- jacket opening second section --

Signed and Sealed this

Twenty-seventh Day of July, 2004

JON W. DUDAS
*Acting Director of the United States Patent and Trademark Office*